June 7, 1938.    L. E. SHAW    2,120,117
DISPLAY DEVICE
Filed May 1, 1935    3 Sheets-Sheet 1
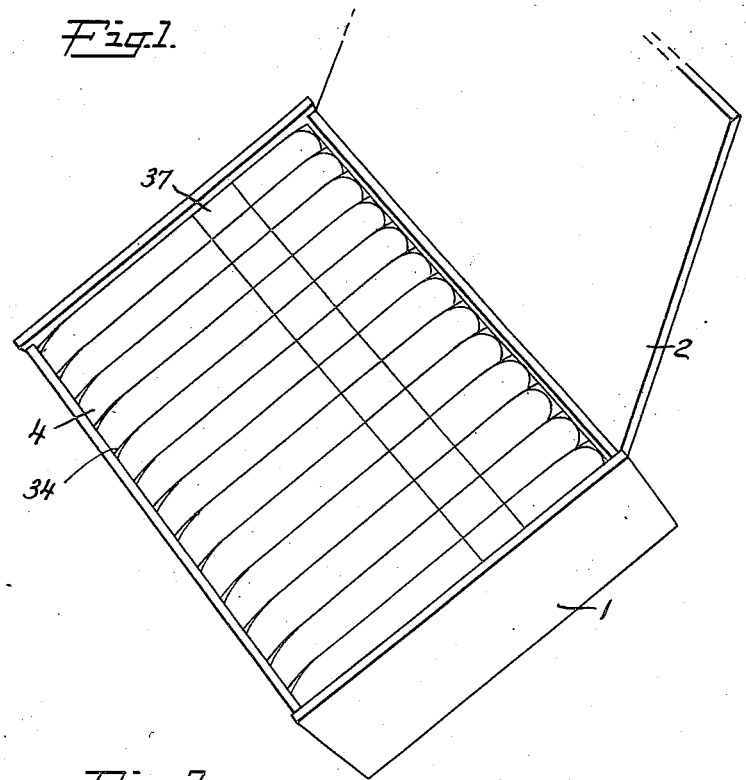
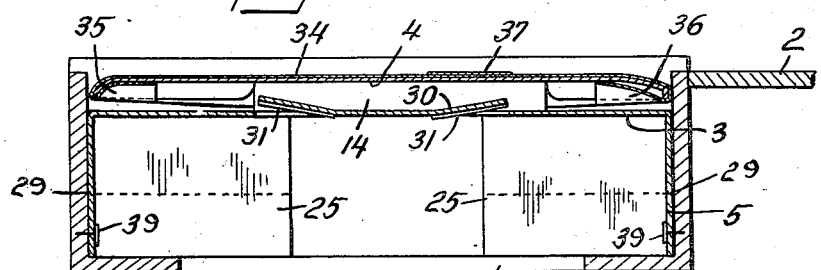
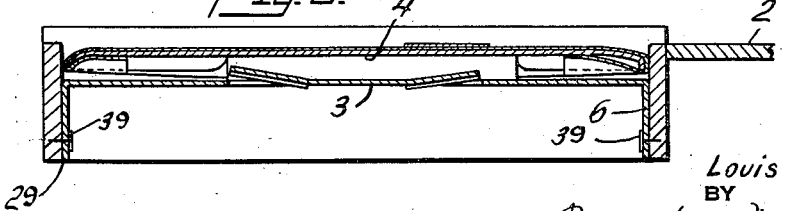
INVENTOR
Louis E. Shaw
BY
ATTORNEYS June 7, 1938. L. E. SHAW 2,120,117
DISPLAY DEVICE
Filed May 1, 1935 3 Sheets-Sheet 2
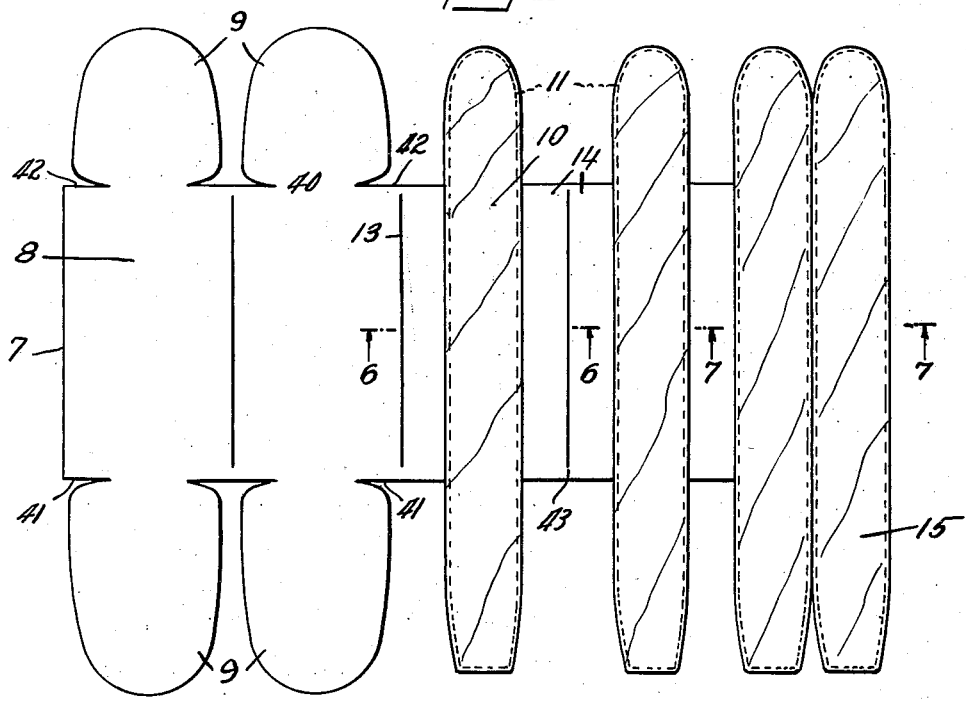
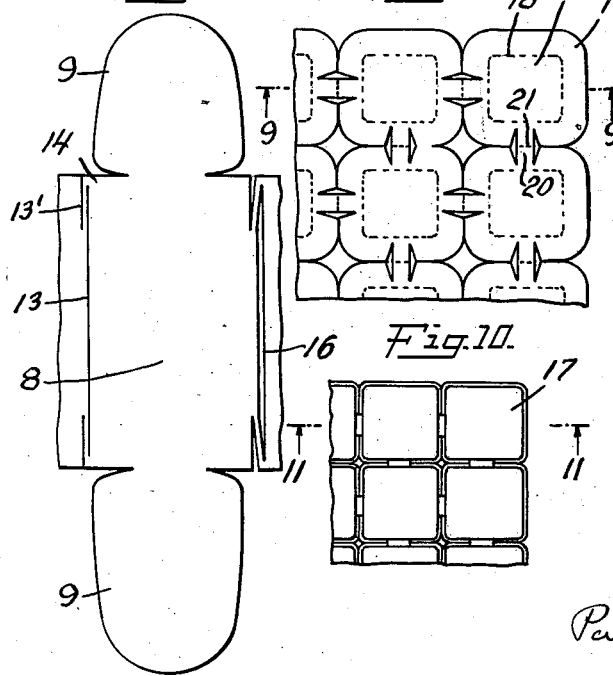
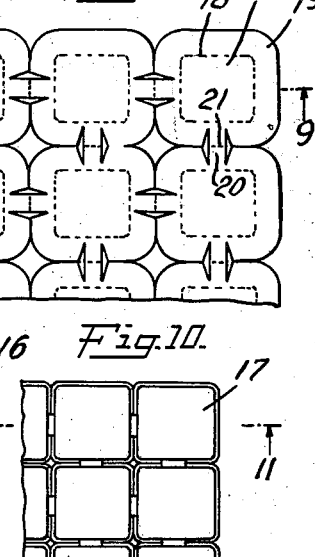
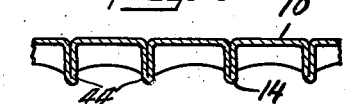
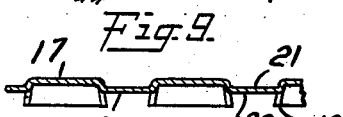
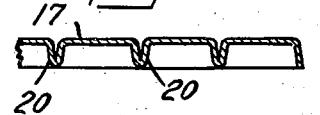
INVENTOR
Louis E. Shaw
BY Pennie, Davis, Marvin & Edmonds
ATTORNEYS June 7, 1938.   L. E. SHAW   2,120,117
DISPLAY DEVICE
Filed May 1, 1935   3 Sheets-Sheet 3
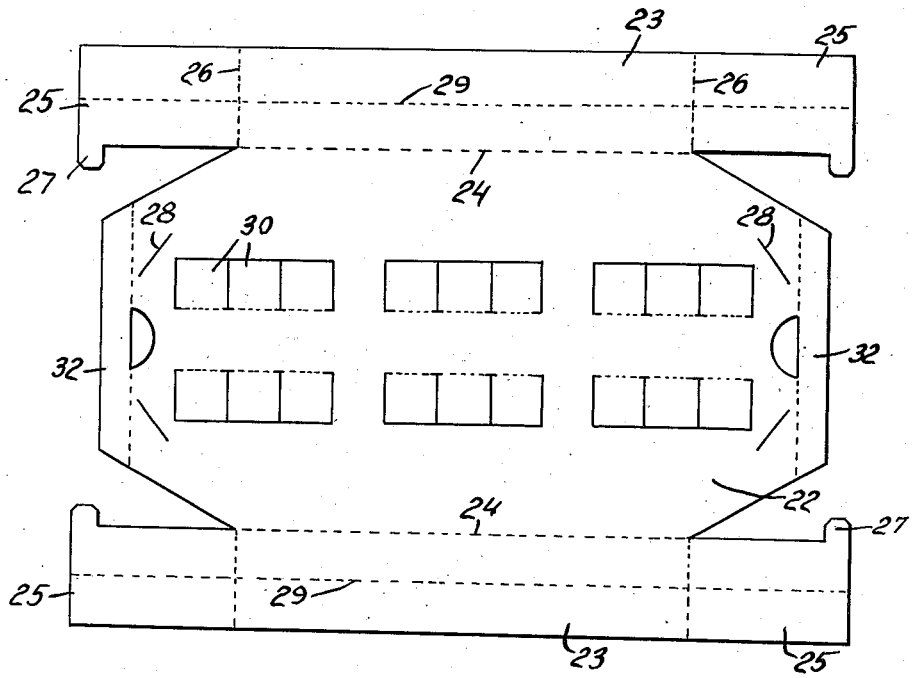
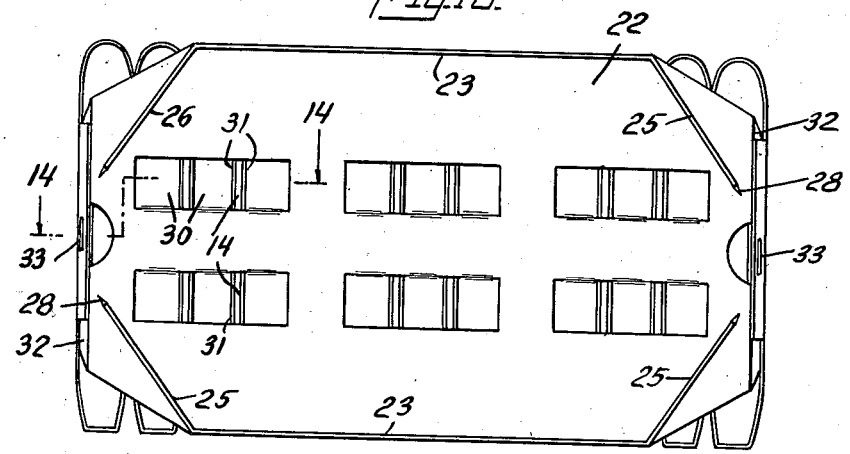
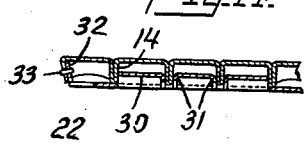
INVENTOR
Louis E. Shaw
BY
Pennie, Davis, Marvin & Edmonds.
ATTORNEYS Patented June 7, 1938

2,120,117

UNITED STATES PATENT OFFICE 2,120,117

DISPLAY DEVICE

Louis E. Shaw, East Orange, N. J., assignor to Ad Art Craft, New York, N. Y., a corporation of Delaware Application May 1, 1935, Serial No. 19,187

21 Claims. (Cl. 40—126)

This invention relates to display devices and more particularly to improvements in the manufacture of plaques consisting of representations of cigars, candies, biscuits, sausages and the like used as displays for such merchandise.

Heretofore in the manufacture of the mats forming a part of such plaques the individual representations were first produced by embossing and the mat was then trimmed around the outline of the representations of the individual articles. The height to which a given design may be raised over the plane surface of the material, usually termed "the depth of the embossing" depends upon the ability of the material to stretch without rupture. In forming mats of paper having a limited amount of elasticity, various expedients have been resorted to such as spacing the embossings so far apart on a sheet that the cumulative stretching power of the paper between them has been sufficient to provide the necessary surplus; or, as disclosed in United States Patent No. 1,985,300 the sheet has been corrugated or otherwise deformed in order to gather within the confines of the die an area of paper equalling the surface area of the die.

In the present invention I produce the effect of deep embossings without previously deforming the paper and also in the case of cigar representations obtain a saving of approximately twenty percent of material. I first provide a specially shaped blank and then form and fold it under heat and pressure. The blank first prepared is substantially the shape of the upper surface of the articles to be simulated plus approximately one-half the side and end walls that are exposed during display. This blank is placed in a die and submitted to heat and pressure whereby the upper exposed surface of the simulations of the individual articles are caused to produce the appearance of the finished article and the material representing the exposed portions of the sides and ends of the article is folded and gathered to produce the desired final appearance.

In the accompanying drawings I have shown several forms of the invention. In the drawings:

Fig. 1 is a perspective view of a cigar box showing a plaque therein in the position normally occupied by the upper layer of cigars in the box;

Fig. 2 is a transverse, sectional, vertical view through the box of Fig. 1 showing the arrangement of the mat and support forming a plaque;

Fig. 3 is a similar view of a box of less depth showing the support arranged for reception in such box;

Fig. 4 is a diagrammatic view of the blank illustrating various steps in the formation of the mat;

Fig. 5 is a similar view of one of the individual blanks of modified form;

Fig. 6 is a detailed, sectional view on line 6—6 of Fig. 4;

Fig. 7 is a similar view on line 7—7 of Fig. 4;

Fig. 8 is a plan view of a blank used in the production of a mat for the display of candies, and similar articles;

Fig. 9 is a detailed, sectional view on line 9—9 of the blank shown in Fig. 8 following the initial embossing operation;

Fig. 10 is a bottom view of the blank shown in Fig. 8 after the pressing and gathering operations;

Fig. 11 is a detailed, sectional view on line 11—11 of Fig. 10;

Fig. 12 is a view of the blank of the support shown in Figs. 1 to 3 before folding;

Fig. 13 is a bottom plan view of the blank after folding and with the mat in position; and Fig. 14 is a detailed, sectional view on line 14—14 of Fig. 13.

Referring to Figs. 1 to 3 of the drawings, I have therein illustrated an ordinary cigar box 1 having the usual hinged lid 2. The plaque representing a row of cigars is adapted to be arranged in the box in the position normally occupied by the top row of cigars so as to produce the appearance of a full box. As shown the plaque consists of a support 3 and a mat 4. The support is adapted to maintain the mat in proper position in a box of the size normally used for packing fifty cigars in four rows or layers as shown in Fig. 2 of the drawings or the vertical legs 5 of the support may be torn off as will be later described to properly support the mat in the position occupied by the top row in a box of twenty-five cigars consisting of two rows. To hold the plaque securely in position in the box and thus allow its display on vertical or over-head surfaces the supporting legs 5 may be attached to the walls of the box by adhesive or other means. The bottom of cigar and candy boxes used for display purposes are customarily perforated with one or more large openings 38 to prevent their being inadvertently placed with saleable stock. Through these openings access may be had to the interior of the box for the insertion of tacks or staples 39, or the boxes may be made bottomless as shown in Fig. 3, thus reducing their cost and weight.

Referring to Figs. 4 and 5 of the drawings the mat is formed from a blank 7. This blank consists approximately of the material which would be obtained if the articles to be displayed were cut in half in a horizontal plane parallel to their upper surfaces and the material of the top surface, sides and ends then flattened out. As shown, each section of the blank comprises a rectangular central portion 8 and head-like end portions 9 which represent the ends of the cigars. The end portions 9 are formed integrally with the narrow ends of the central portions by necks 40 of reduced width formed by cutting V notches 41 in the edges of the portions 9 as they join the end edges 42 of the central portions. In the forming operation the blank is slightly moistened and then placed in a suitable die. The die reproduces the leaf veins and edges of the tobacco in slight relief by a surface embossing operation as shown at 10 in Fig. 4. The width of the cigar representation is, as shown, less than the width of each individual portion 8 and the excess material of the end portions 9 is turned down and gathered into folds by reason of the pressure employed producing a depending flange 11 around each edge representing the side walls and end of the cigar as shown in Fig. 6. This leaves a certain amount of material 14 between each pair of adjacent central portions. This material is cut along an intermediate line to form a slot 13 which terminates at opposite ends a short distance from the adjacent edge 42 to leave a connection 43 between adjacent portions 8 at opposite ends thereof. When the device is removed from the die the individual representations appear as the two central representations in Fig. 4 of the drawings. The intermediate material 14 is then folded downwardly along the line 13 to gather the representations of the cigars into close proximity to each other as indicated at 15 at the right of Fig. 4. The gathered portions then appear as shown in Fig. 7 of the drawings with the down-folded material 14 forming flanges 44 of double layers of material. It will be apparent that the central portions 8 of the individual cigars which are exposed to view when the plaque is arranged in the box consist only of a surface embossing when the unembossed material 14 is folded between the two adjacent representations whereas the end portions which are exposed to view are folded over as at 11 to create the appearance of depth. This materially reduces the amount of paper necessary over that heretofore used when the individual embossings were first formed. The length of paper necessary equals the length of the die measured from outside to outside of its two end impressions, plus the length necessary to secure the ends of the mat to the support as shown in Fig. 14.

In Fig. 5 of the drawings I have shown a slight modification of a portion of a blank representing a single representation. As shown, the line 13 consists of one long slot wholly within the width of the blank and of two parallel relatively short slits 13' extending toward one another from opposite edges 42. It will be noted that the uncut portions of the slits are staggered with respect to each other which provides sufficient strength to hold the paper together during the process of fabrication but offers exceedingly small resistance to the forming of the paper along lines 12. This permits the use of hard grades of paper possessing little or no elasticity, the paper being free to separate as shown at 16 under the tension resulting from the action of the die along lines 12.

The invention may be applied to the illustration of other products than cigars and in Figs. 8 to 11 I have illustrated its application to the display of candies. Referring to these figures, Fig. 8 represents a blank prior to treatment, the central dotted portion 17 of which representation represents the upper surface of the candy. In the forming operation the blanks are scored along the dotted line 18 and the marginal portions 19 are folded and pressed to represent the side walls of the candies. These portions, after the forming operation and before gathering are shown in Fig. 9 of the drawings. Each individual blank is connected to the adjacent blanks by tabs 20 and these tabs are scored along a central line 21 so that they may be folded as shown in Fig. 11 to gather the individual representations into close proximity to each other. A bottom view of the gathered mat is shown in Fig. 10 of the drawings.

The support adapted for use in connection with the mat shown in Figs. 4 to 7 is shown in Figs. 12 to 14 of the drawings. As shown, it consists of a main or body portion 22 which is adapted to be arranged in a horizontal plane in the box to support the mat. Opposite ends of the body portion have their opposite edges bevelled and thus provide ends of reduced width. Each side of the blank is provided with what may be termed side flanges or legs 23 connected to the main portion of the blank by a scored line 24 to permit folding so that the side flanges may be arranged at right angles to the main portion of the support as shown at 5 in Fig. 2 of the drawings. These side flanges are provided at opposite ends with side flange extensions 25 with scored lines 29 therebetween and which extensions 25 are adapted to be folded at an angle as shown in Fig. 13. These end extensions are made of sufficient length to project somewhat beyond the ends of the finished plaque, necessitating their being bent at an angle along score line 26 before the plaque can be placed in its box. In this position the extensions lie beneath the main portion 22 of the plaque and act as braces to maintain the side flanges 23 in a position at right angles thereto. There is thus no possibility of the side flanges 23 being bent to an acute angle.

In Fig. 12 the blank is shown with tabs 27 adapted to be received by slots 28 in the main portion of the support, thus holding the end extensions independently of the confining walls of the box. This construction, while advantageous in some instances, is not at all times essential. When the support is to be used in a small box such as is shown in Fig. 3 the side flanges 23 are torn off along scored lines 29 to provide the proper height for supporting the mat in the smaller box. The central portion of the support is cut to provide a plurality of tabs 30 of a width equal to the distance forming the flange 44 between the folded portions 14 between the individual representations of the cigars of the mat. The mat is secured to the support by pushing the tabs 30 into the spaces between the folded portions 14 of the mat. Inasmuch as the tabs 30 are originally of the same width as the individual cigar representations and the space into which they are forced is this width less the two thicknesses of the paper from which the mat is formed the edges of the tabs bend along the line 31, when they are forced into position, and thus frictionally hold the support in firm engagement with the mat. The ends of the support are provided with attaching flanges 32 to which the ends of the mat may be secured by staples 33 or other suitable means.

By means of the present invention a plaque may be produced in which the mat is formed of less material than that heretofore employed in the embossed mats. Furthermore due to the fact that the exposed ends and sides of the individual representations are formed from a pre-cut blank having free edges the danger of tearing the paper is reduced to a minimum. Those portions of the mat having height are merely folded and gathered by heat and pressure while moist and become set as the moisture dries out so that the mat retains its form after being ejected from the die. In addition to the advantage of saving of material and greater ease of operation the finished plaque is of approximately one-half the thickness of the plaque formed by the method shown by Sanders in United States Patent No. 1,823,988 and as they are always shipped and stored flat, about twice as many plaques can be packed in a carton, thus reducing the expense of shipment and facilitating storage.

At the present time many cigars and candies are marketed in individual wrappers or envelopes. Bands, when used, are placed either directly around the articles inside the envelopes or around the outside of the envelopes. In some instances the wrapping material is printed, rendering the use of bands unnecessary.

To simulate the appearance of a top layer of articles in plain envelopes I place a sheet of material 34 over the mat and tuck it into the spaces provided by the folded portions 14. The sides of the sheet are folded under the ends of the representation as shown at 35 and 36. The usual bands, cut to proper length, may be attached either to the individual representation or to the outer surface of the transparent covering by means of a suitable adhesive, the ends being tucked into the folded portion 14.

To simulate the appearance of printed envelopes I print the wrapping material before applying it to the mat, the individual design being so located as to register with the individual representation when assembled, or with a group of representations in such instances as the articles are normally packaged in multiple as, for example, cigars that retail "three for ten cents", the wrapping material then being tucked into every third fold 14.

I claim:

1. In the art of forming a tri-dimensional plaque simulating a series of separate articles to be displayed, the method which consists in producing a flat unembossed blank of a size and configuration equal to the sum of the upper surfaces together with the associated sides and ends of the simulated articles, slitting the blank along the midportion of the lines which in the finished plaque define the bends connecting adjacent sides, leaving short lengths of connecting material between said sides at opposite ends of said lines, moistening the blank and subjecting the blank to a die press action, to fold over with the slits at the bends of the fold and gather the portions of the blank forming the sides and ends while subjecting them to pressure and heat to form the representations of the sides and ends of the several articles simulated.

2. In the art of producing a tri-dimensional plaque forming a simulation of a plurality of real articles arranged in a flat layer and in close relation to each other, the method which consists in preforming a flat unembossed paper blank consisting of a plurality of connected sections, each section including a central portion for eventually forming the upper surface of the article simulated and also including a marginal portion surrounding and enclosing the central portion for eventually forming the side and end walls of the article simulated and with said side forming portions of adjacent sections integrally connected in order, subjecting the blank to the forming action of a die press in the presence of heat and moisture to form the central portions of the several sections into the upper surfaces of the representations of the several articles and simultaneously to bend the side and end walls into position substantially perpendicular to the upper surfaces while gathering and folding the portions forming the end walls to produce a finished appearance to each of the individual representations, and then gathering the representations so formed into the relative close proximity in which the real articles are arranged in the simulated layer.

3. In the art of producing a tri-dimensional plaque simulating a layer of cigars arranged in parallel relation and in abutting or substantially side abutting relation, the method which consists in producing a single flat unembossed blank consisting of a plurality of similar shaped sections connected in order, each section having a shape area corresponding substantially to the developed surface of the top and sides of a cigar, subjecting the blank to a die pressing operation in the presence of heat and moisture to fold and gather the material which forms the sides of the representation to the form of sides of the articles represented and subjecting the portion forming the top of the cigar representation to a surface embossing to simulate the appearance of the real cigar, and folding the unembossed material between the adjacent sides of the individual cigar representations into position to bring the embossed tops of the representations into the substantially abutting relation of a layer of real cigars.

4. In the art of producing a tri-dimensional plaque forming a simulation of a plurality of real articles arranged in a flat layer and in close relation to each other, the method which consists in forming a flat unembossed paper blank consisting of a plurality of connected sections, each section including a central portion for eventually forming the upper surface of the article simulated and also including a portion surrounding and enclosing the central portion for eventually forming the side and end walls of the article simulated and with said side forming portions integrally connected in order, subjecting the blank so formed to the forming action of a die press in the presence of heat and moisture to emboss and form the central portions of the several sections into the upper surfaces of the representations of the several articles and simultaneously to bend the side and end walls into position substantially perpendicular to the upper surfaces while gathering and folding the portions forming the end walls to produce a finished appearance to each of the individual representations.

5. In the art of producing a tri-dimensional plaque simulating a layer of real articles, the method which consists in shaping a flat blank into connected sections, each section corresponding to the developed area of the top and sides of the article which it is intended to represent, slitting the blanks along the lines dividing the sections from each other while leaving connecting portions at the ends of the slits, subjecting the blank so formed to a die press operation to form the several sections into the shapes of the articles represented and folding the sections along the slitted lines thereby to gather closer together the portions forming the exposed tops of the representations.

6. In the art of producing a tri-dimensional plaque simulating a layer of rear articles, the method which consists in shaping a flat blank into connected sections, each section corresponding to the developed area of the tops and sides of the article which it is intended to represent, slitting the blanks along the lines dividing the sections from each other while leaving connecting portions at the ends of the slits, subjecting the blank so formed to a die press operation to form the several sections into the shapes of the articles represented and folding the sections along the slitted lines thereby to gather closer together the portions forming the exposed tops of the representations and simultaneously surface embossing the top of the several representations.

7. A flat blank for forming a plaque simulating a row of cigars, comprising a strip of paper provided with a plurality of parallel equi-distantly spaced apart slits dividing the strip into sections, each section comprising a rectangular central portion with the slits defining opposite long edges, each slit terminating at its opposite ends in spaced relation to the adjacent end of the central portion to form connections at opposite ends of the central portions and head-like end portions forming projections at opposite ends of the central portion, said projections integrally connected to their associated central portion by neck-forming portions of reduced width.

8. A flat blank for forming a plaque simulating a row of cigars, comprising a strip of paper provided with a plurality of parallel equi-distantly spaced apart slits dividing the strip into sections, each section comprising a rectangular central portion with the slits defining opposite long edges, each slit terminating at its opposite ends in spaced relation to the adjacent end of the central portion to form connections at opposite ends of the central portions and head-like end portions forming projections at opposite ends of the central portion, said projections integrally connected to their associated central portion by neck forming portions of reduced width and each central section provided at its opposite ends with a supplemental slit extending from the end edges inwardly for a short distance parallel to and in juxtaposition to the first named slit.

9. A flat blank for forming a support comprising a rectangular body portion having beveled edge ends of reduced width, each end provided adjacent opposite sides thereof with a slit, said body portion provided at opposite sides with extensions forming side flanges with scored lines about which the side flanges may be bent to extend at right angles to the body portion and each side flange provided at opposite ends thereof with side flange extensions and with score lines about which the extensions may be bent at right angles to the bent side flanges, each side flange extension provided with a tab adapted to be inserted into the adjacent slit in the end extension to secure the corresponding side flange and side flange extension in their folded position.

10. A flat blank for forming a support comprising a rectangular body portion having beveled edge ends of reduced width, each end provided adjacent opposite sides thereof with a slit, said body portion provided at opposite sides with extensions forming side flanges with scored lines about which the side flanges may be bent to extend at right angles to the body portion and each side flange provided at opposite ends thereof with side flange extensions and with score lines about which the extensions may be bent at right angles to the bent side flanges, each side flange extension provided with a tab adapted to be inserted into the adjacent slit in the end extension to secure the corrsponding side flange and side flange extension in their folded position and slits formed in the body portion and the portion of material between the slits adapted to be bent out of the plane of the balance of the body portion to form tabs.

11. A blank for forming a simulation of a plurality of articles arranged in a layer, said blank comprising a sheet of flat material completely precut to its final shape and including a plurality of integrally connected sections, each section comprising a rectangular central portion and curved end portions projecting from opposite ends of the central portion, said sections provided with notches separating the central portions from each of their associated end portions, said central portion and end portions coacting to form the top of one of the simulations and a marginal portion surrounding both the central portion and end portions and adapted to be bent subsantially at right angles thereto to form the sides of the simulation and adjacent sides of contiguous marginal portions when so bent being in substantially parallel relation thereby to bring the tops of the simulations into juxtaposition connected to each other while leaving opposite ends of the simulations formed by the end portions free of each other.

12. A display device comprising a mat and a support therefore, said support comprising a single layer of material comprising a main portion having supporting flanges depending from the opposite edges thereof and provided with a slitted portion bent out of the plane of the main portion to form clamping means integral with the main portion for clamping the mat and said mat comprising a single layer of material having portions simulating the articles displayed and having the material between the simulating portions folded upon itself to form depending flanges clamped by said clamping means and said slitted portion projecting upwardly into the interior of the simulating portions and forming an internal reinforcement for the same.

13. In a display device, the combination of a mat and a support therefor, each formed of a single sheet of material, said mat die pressed to form simulations of the top and sides of the articles to be displayed with the adjacent sides of certain of the article simulations forming depending spaced parallel flanges, and the support provided with a tab integral with and bent from the remainder of the support, fitted between and at opposite edges frictionally engaging an adjacent pair of the depending flanges to secure the mat to the support.

14. In a display device, the combination of a mat and a support therefor, each formed of a single sheet of paper, the mat being die-pressed to form a plurality of open bottom hollow members, each simulating the top and sides of an article and with the lower edge of one side of one simulation connected integrally with the lower edge of the side of an adjacent simulation, and said support provided with integral tabs intruded into the hollow space in certain of the members and frictionally engaging the inner faces of their sides.

15. In a device of the class described, a two part unit adapted to be inserted in a box to simulate a top layer of real articles in the box, said unit comprising a mat and a support therefor, each formed of a single layer of paper, the mat being die-pressed and folded to form a plurality of open bottom representations of the real articles and each representation having its upper exposed surface embossed to simulate the article represented, the portion of the paper between the representations being unembossed and folded downwardly to form depending clamped flanges and said support provided at opposite sides with down-turned supporting side flanges, and opposite end edges being upturned to form attaching flanges lapping the outer sides of the adjacent end representations and secured thereto, and said support provided with upturned tabs for engaging opposite sides of one of the clamped flanges to secure the associated representations directly to the support.

16. A paper blank for forming a layer of representations of real articles, said blank cut to provide a plurality of connected sections each fashioned to form one of the representations with the dividing lines between adjacent sections being formed of spaced apart slits in alignment and the part of the sheet therebetween being scored in alignment with the slits, each section having a central portion defined by an endless score line defining the portion which eventually becomes the upper surface of the representation, the peripheral edge of each of said sections as defined at least in part by said aligned slits and connecting score lines having the same configuration as the endless score line and the portion of the sheet between said endless score line and said peripheral edge adapted to form the upstanding sides of the representation.

17. A paper blank for forming at least a pair of hollow representations of the top, side and ends of real articles, comprising an unembossed sheet of paper including two identical sections, integrally connected at a common dividing line and at a point adjacent the mid-length of said common dividing line and separated in prolongation of said common dividing line at opposite ends of their integrally connected part, each section including a central portion fashioned to form eventually the exposed top portion of the representations and each section including a marginal portion fashioned to form eventually the sides and ends of the representation.

18. A partly formed blank comprising a single sheet of paper having embossed thereon a plurality of parallel representations of the top surface and end walls of cigars projecting at their mid-length slightly above the plane of the balance of the sheet and unembossed strips of less length than the representations integrally connecting adjacent representations adjacent their mid-lengths, said connecting strips forming the balance of the sheet and adapted to be folded upon themselves to form flanges and eventually to bring the representations closer together.

19. A partly formed blank comprising a substantially rectangular strip of paper having spaced apart extensions from opposite long edges, said extensions being aligned in pairs transversely of the length of the strip, each of said pairs of extensions and the central portion of the strip therebetween being shaped to simulate the top side and end walls of a cigar leaving the balance of the strip forming connecting strips between the cigar simulations at their mid-length and each of said strips being slit in a straight line to facilitate folding of the connecting strips back upon themselves along the line of the slit.

20. A blank of fibrous sheet material having certain portions shaped to provide material for embossing in simulation of the top surfaces of a plurality of articles and certain other portions adapted to be folded in simulation of the side walls of said articles, and having slits along lines defining adjacent edges of said side walls to allow elongation of the blank without material distortion of the fibers thereof.

21. A mat of fibrous material comprising embossed representations of the upper surfaces of a plurality of articles in spaced relation, the unembossed portions between adjacent embossings being slitted to permit elongation of the mat without material elongation of the fibers thereof.

LOUIS E. SHAW.